United States Patent
Lazo et al.

(10) Patent No.: US 10,261,367 B2
(45) Date of Patent: Apr. 16, 2019

(54) LIQUID CRYSTAL DISPLAY AND METHOD OF MANUFACTURING THE SAME

(71) Applicant: SAMSUNG DISPLAY CO., LTD., Yongin-si, Gyeonggi-do (KR)

(72) Inventors: Israel Esteban Lazo, Hwaseong-si (KR); Heung Shik Park, Seoul (KR); Ki Chul Shin, Seongnam-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 121 days.

(21) Appl. No.: 15/466,404

(22) Filed: Mar. 22, 2017

(65) Prior Publication Data
US 2017/0293187 A1     Oct. 12, 2017

(30) Foreign Application Priority Data
Apr. 8, 2016  (KR) .................... 10-2016-0043238

(51) Int. Cl.
G02F 1/1343   (2006.01)
G02F 1/1337   (2006.01)
G02F 1/1333   (2006.01)

(52) U.S. Cl.
CPC .. *G02F 1/134309* (2013.01); *G02F 1/133345* (2013.01); *G02F 1/133707* (2013.01)

(58) Field of Classification Search
None
See application file for complete search history.

(56) References Cited

U.S. PATENT DOCUMENTS

| 2011/0317104 A1 | 12/2011 | Nakamura et al. |
| 2014/0125896 A1 | 5/2014 | Suwa et al. |

*Primary Examiner* — Richard H Kim
(74) *Attorney, Agent, or Firm* — F. Chau & Associates, LLC

(57) ABSTRACT

A liquid crystal display (LCD) includes a substrate, an overcoat layer disposed on the substrate, and a pixel electrode disposed on the overcoat layer. The pixel electrode includes a stem electrode and a plurality of branch electrodes. The stem electrode extends in a first direction and in a second direction crossing the first direction to have a cross shape, and the plurality of branch electrodes extends from the stem electrode obliquely to the first direction and the second direction. The overcoat layer includes a base layer and a plurality of ridge patterns which protrude from a surface of the base layer. The plurality of ridge patterns extends in a different direction from the direction in which the plurality of branch electrodes extends.

15 Claims, 13 Drawing Sheets ary embodiment of the present invention will be described more fully hereinafter with reference to accompanying drawings. The present invention may, however, be embodied in different forms and should not be construed as
LIQUID CRYSTAL DISPLAY AND METHOD OF MANUFACTURING THE SAME This application claims priority under 35 U.S.C. § 119 to Korean Patent Application No. 10-2016-0043238, filed on Apr. 8, 2016, in the Korean Intellectual Property Office, the disclosure of which is incorporated by reference herein in its entirety.

TECHNICAL FIELD

The present invention relates to a display device, and more particularly, to a liquid crystal display (LCD) and a method of manufacturing the same.

DISCUSSION OF THE RELATED ART

Liquid crystal displays (LCDs) are one of the most widely used types of flat panel displays. Generally, an LCD includes a pair of substrates having electric field generating electrodes, such as pixel electrodes and a common electrode, and a liquid crystal layer injected between the two substrates. In an LCD, voltages are applied to the electrodes to generate an electric field in a liquid crystal layer. Accordingly, the liquid crystals of the liquid crystal layer can be oriented in a desired direction and polarization of incident light is controlled. As a result, a desired image is displayed on the LCD.

A vertical alignment (VA) mode of an LCD is a mode in which the long axes of liquid crystals are aligned perpendicularly to the upper and lower substrates when no electric field is applied by the electrodes.

However, LCDs that operate in the VA mode may have low lateral visibility. For example, at a low gray level, an LCD operating in the VA mode may appear brighter when viewed from the side than when viewed from the front.

SUMMARY

According to an exemplary embodiment of the present invention, a liquid crystal display (LCD) includes a substrate, an overcoat layer disposed on the substrate, and a pixel electrode disposed on the overcoat layer. The pixel electrode includes a stem electrode and a plurality of branch electrodes. The stem electrode extends in a first direction and in a second direction crossing the first direction to have a cross shape, and the plurality of branch electrodes extends from the stem electrode obliquely to the first direction and the second direction. The overcoat layer includes a base layer and a plurality of ridge patterns which protrude from a surface of the base layer. The plurality of ridge patterns extends in a different direction from the direction in which the plurality of branch electrodes extends.

According to an exemplary embodiment of the present invention, an LCD includes a first substrate, a pixel electrode disposed on the first substrate, a second substrate facing the first substrate, an overcoat layer disposed on a surface of the second substrate which faces the first substrate, a plurality of ridge patterns disposed on the overcoat layer and protruding from a surface of the overcoat layer toward the first substrate, a common electrode disposed on the overcoat layer, and a liquid crystal layer disposed between the first substrate and the second substrate. The overcoat layer includes a base layer and the ridge patterns protrude from a surface of the base layer toward the first substrate. The common electrode is formed conformally along a surface of the overcoat layer.

According to an exemplary embodiment of the present invention, a method of manufacturing an LCD includes forming an overcoat layer on a substrate, the overcoat layer including a plurality of ridge patterns, a base layer and a contact hole, and forming a pixel electrode on the overcoat layer. The forming of the overcoat layer includes forming an organic composition layer by coating an organic composition on the substrate, exposing and developing the organic composition layer such that the organic composition layer has a first thickness corresponding to a thickness of the base layer in a first region, and a second thickness corresponding to a thickness of at least one of the plurality of ridge patterns in a second region, the first and second thicknesses being different from each other, and forming the contact hole by etching the organic composition layer such that the contact hole passes through the base layer, the plurality of ridge patterns and the overcoat layer.

BRIEF DESCRIPTION OF THE DRAWINGS

The above and other features of the present invention will become more apparent by describing in detail exemplary embodiments thereof in conjunction with the accompanying drawings, in which.

DETAILED DESCRIPTION OF THE EMBODIMENTS

Figure 1:
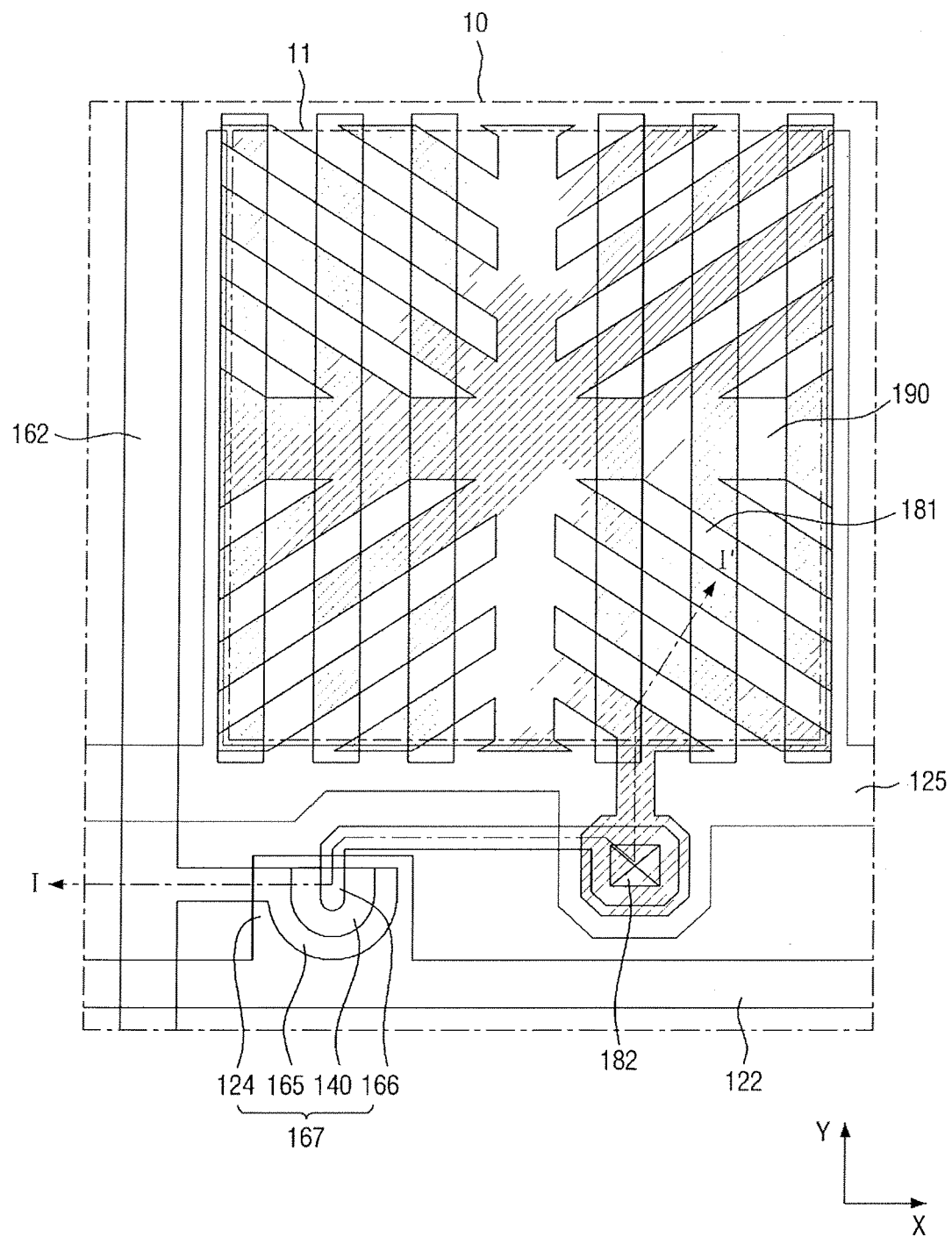
FIG. 1 is a plan view illustrating a pixel of a liquid crystal display (LCD) according to an exemplary embodiment of the present invention.

Exemplary embodiments of the present invention will be described more fully hereinafter with reference to accompanying drawings. The present invention may, however, be embodied in different forms and should not be construed as limited to the embodiments set forth herein. Like reference numerals may refer to like elements throughout the specification. The sizes or proportions of elements illustrated in the drawings may be exaggerated for clarity.

As used herein, the singular forms "a," "an," and "the" may encompass the plural form as well, unless the context clearly indicates otherwise.

Figure 2:
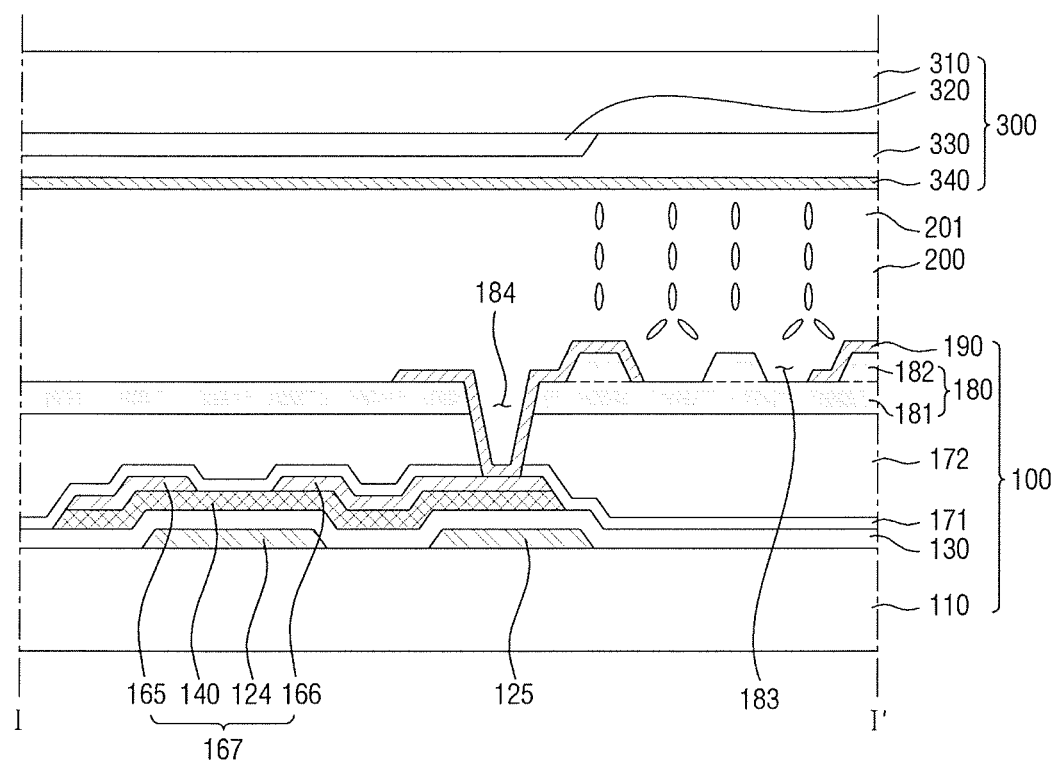
FIG. 2 is a cross-sectional view taken along the line I-I' of FIG. 1 according to an exemplary embodiment of the present invention.
Figure 3:
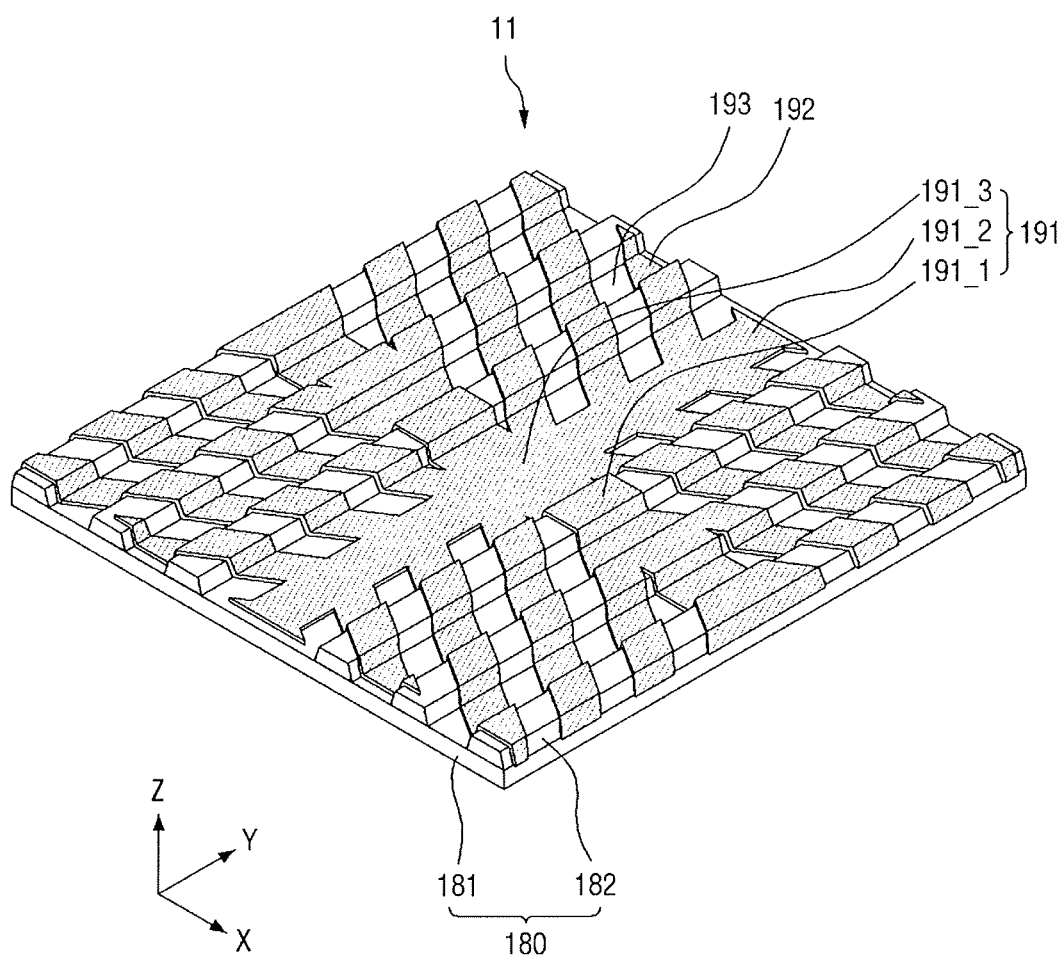
FIG. 3 is a perspective view illustrating a pixel electrode of FIG. 1 according to an exemplary embodiment of the present invention.
Figure 4:
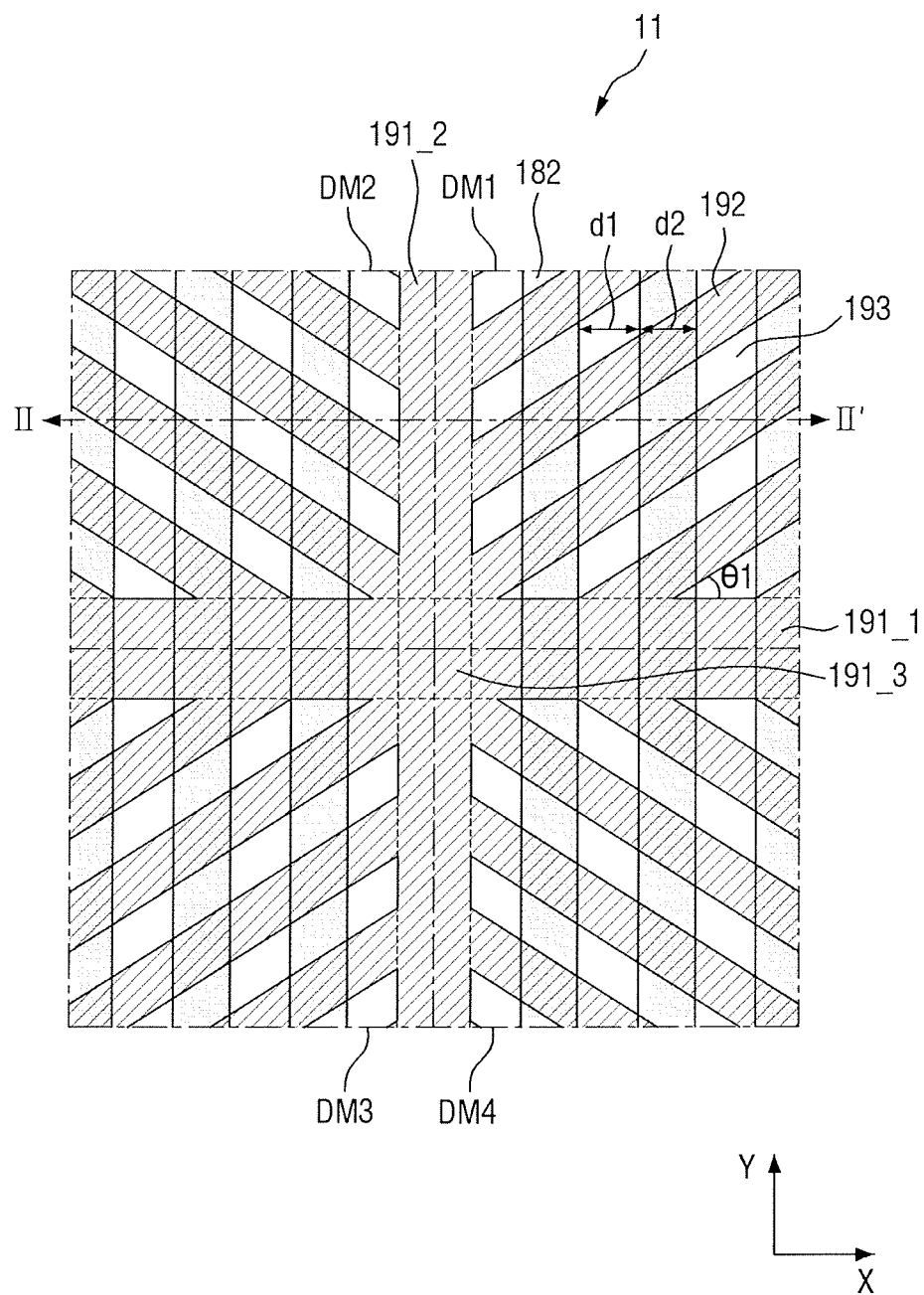
FIG. 4 is a plan view illustrating a first overcoat layer and a pixel electrode disposed in an active area of FIG. 1 according to an exemplary embodiment of the present invention.
Figure 5:
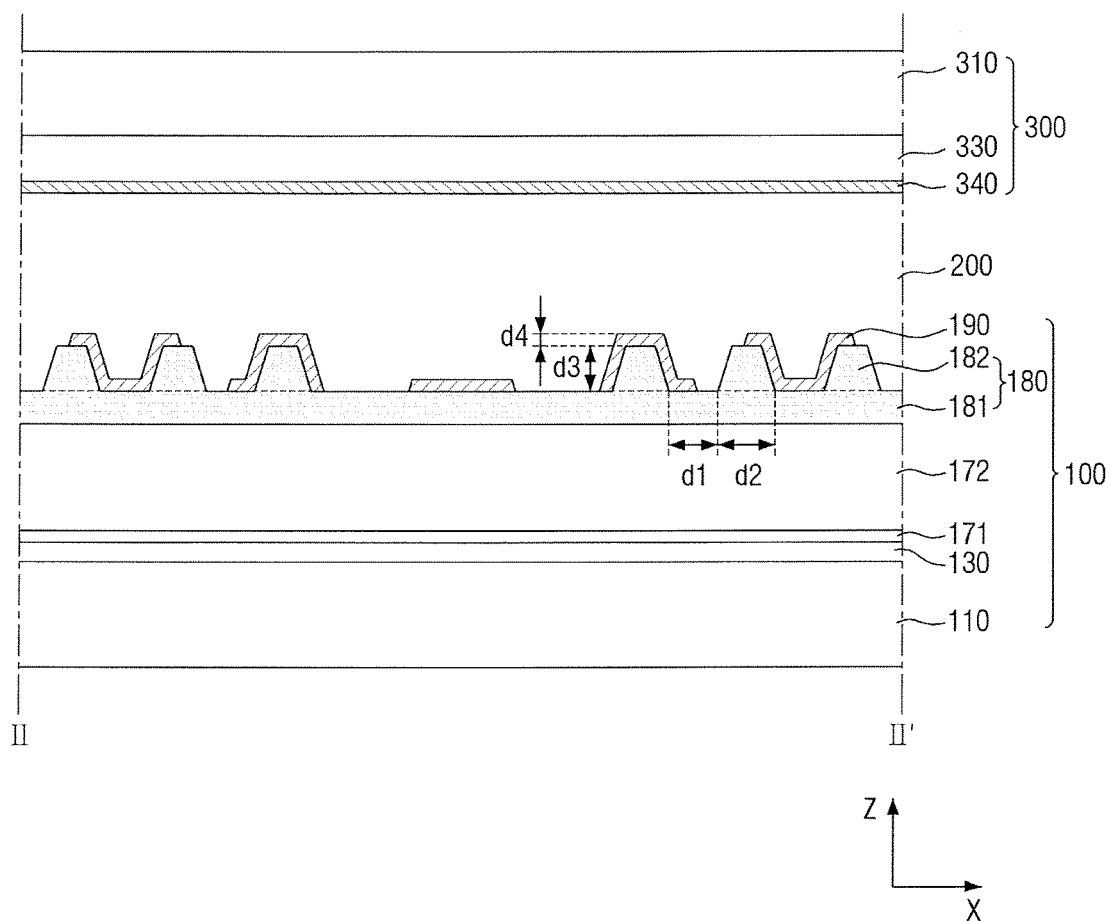
FIG. 5 is a cross-sectional view taken along the line II-II' of FIG. 4 according to an exemplary embodiment of the present invention.

FIG. 1 is a plan view illustrating a pixel of a liquid crystal display (LCD) according to an exemplary embodiment of the present invention. FIG. 2 is a cross-sectional view taken along the line I-I' of FIG. 1 according to an exemplary embodiment of the present invention. FIG. 3 is a perspective view illustrating a pixel electrode of FIG. 1 according to an exemplary embodiment of the present invention. FIG. 4 is a plan view illustrating a first overcoat layer and a pixel electrode disposed in an active area of FIG. 1 according to an exemplary embodiment of the present invention. FIG. 5 is a cross-sectional view taken along the line II-II' of FIG. 4 according to an exemplary embodiment of the present invention.

Referring to FIGS. 1 through 5, an LCD includes a first display substrate 100, a second display substrate 300, and a liquid crystal layer 200.

The first display substrate 100 is a substrate on which a thin-film transistor (TFT) 167, e.g., a switching device for controlling a data voltage provided to a pixel electrode 190 is disposed. The second display substrate 300 faces the first display substrate 100, and forms the LCD with the first display substrate 100 and the liquid crystal layer 200. The liquid crystal layer 200 includes liquid crystals 201 and is interposed between the first display substrate 100 and the second display substrate 300.

The LCD includes a plurality of pixels 10 arranged in a matrix. A gray level of each of the pixels 10 can be controlled independently, and each of the pixels 10 may be a smallest unit which displays a specific color. Each of the pixels 10 includes the active area 11. The active area 11 displays a specific color by transmitting light incident from under the first display substrate 100 toward the second display substrate 300.

The first display substrate 100 will be described hereinafter.

The first display substrate 100 includes a first base substrate 110. The first base substrate 110 may be a transparent insulating substrate. For example, the first base substrate 110 may be a glass substrate, a quartz substrate, a transparent resin substrate, or the like.

In an exemplary embodiment of the present invention, the first base substrate 110 may be curved in a given direction. In an exemplary embodiment of the present invention, the first base substrate 110 may be flexible. For example, the first base substrate 110 may be a deformable substrate that can be rolled, folded, or bent.

A gate line 122, a gate electrode 124, and a storage line 125 are disposed on the first base substrate 110.

The gate line 122 delivers a gate signal to the TFT 167. The gate line 122 may extend in a first direction X.

Here, the first direction X may be a direction extending parallel to a side of the first base substrate 110 and may be a direction indicated by an arbitrary straight line extending from a left side toward a right side of FIG. 1, as illustrated in FIG. 1. However, the first direction X is not limited to the above example. For example, the first direction X might not necessarily be parallel to a side of the first base substrate 110 and may also be a direction indicated by an arbitrary straight line extending in a specific direction on the first base substrate 110.

The gate signal may be provided from an external circuit and have a variable voltage value. The turning on or off of TFT 167 may be controlled by the voltage value of the gate signal.

The gate electrode 124 may protrude from the gate line 122 and may be an element of the TFT 167.

The storage line 125 is disposed between the gate line 122 and an adjacent gate line 122. The storage line 125 extends along the first direction X but may also extend along an edge of the active area 11. The storage line 125 may overlap part of the pixel electrode 190 or may be disposed adjacent to the pixel electrode 190. A capacitance may be formed between the pixel electrode 190 and the storage line 125. Accordingly, a rapid drop in a voltage charged in the pixel electrode 190 can be prevented. However, if a drop in the voltage charged in the pixel electrode 190 does not adversely affect the display quality or affects display quality to an acceptable level without the storage line 125, the storage line 125 may be omitted.

The gate line 122, the gate electrode 124 and the storage line 125 may include the same material. In an exemplary embodiment of the present invention, the gate line 122, the gate electrode 124 and the storage line 125 may each include an aluminum (Al)-based metal such as aluminum or an aluminum alloy, a silver (Ag)-based metal such as silver or a silver alloy, a copper (Cu)-based metal such as copper or a copper alloy, a molybdenum (Mo)-based metal such as molybdenum or a molybdenum alloy, chromium (Cr), titanium (Ti), and/or tantalum (Ta). In addition, the gate line 122, the gate electrode 124 and the storage line 125 may have a single layer structure or a multilayer structure including at least two conductive layers with different physical characteristics.

A gate insulating layer 130 is disposed on the gate line 122, the gate electrode 124 and the storage line 125. The gate insulating layer 130 may include an insulating material. In an exemplary embodiment of the present invention, the gate insulating layer 130 may include silicon nitride or silicon oxide. The gate insulating layer 130 may have a single layer structure or a multilayer structure composed of at least two insulating layers with different physical characteristics.

A semiconductor layer 140 is disposed on the gate insulating layer 130. At least part of the semiconductor layer 140 may overlap the gate electrode 124. The semiconductor layer 140 may include amorphous silicon, polycrystalline silicon, or an oxide semiconductor.

The semiconductor layer 140 may overlap not only the gate electrode 124 but also at least part or all of a data line 162, a source electrode 165 and a drain electrode 166.

Although not illustrated in the drawings, in an exemplary embodiment of the present invention, ohmic contact members may be additionally disposed on the semiconductor layer 140. The ohmic contact members may include n+ hydrogenated amorphous silicon heavily doped with an n-type impurity or may include silicide. The ohmic contact members may form a pair and may be disposed accordingly on the semiconductor layer 140. The ohmic contact members may be disposed between the source and drain electrodes 165 and 166 and the semiconductor layer 140 to form an ohmic contact between them. If the semiconductor layer 140 includes an oxide semiconductor, the ohmic contact members may be omitted.

The data line 162, the source electrode 165 and the drain electrode 166 are disposed on the semiconductor layer 140 and the gate insulating layer 130.

The data line 162 may extend in a second direction Y to intersect the gate line 122.

Here, the second direction Y may be a direction intersecting the first direction X in a plane in which the first base substrate 110 is disposed, or may be a direction indicated by an arbitrary straight line extending from a lower side toward an upper side of FIG. 1, as illustrated in FIG. 1. In an exemplary embodiment of the present invention, the first direction X and the second direction Y may perpendicularly intersect each other.

The data line 162 may be insulated from the gate line 122, the gate electrode 124 and the storage line 125 by the gate insulating layer 130.

The data line 162 may provide a data signal to the source electrode 165. The data signal may be provided from an external circuit and have a variable voltage value. The gray level of each of the pixels 10 may be controlled according to the data signal.

The source electrode 165 may branch from the data line 162, and at least part of the source electrode 165 may overlap the gate electrode 124.

In plan view, the drain electrode 166 may be separated from the source electrode 165 with the semiconductor layer 140 interposed between them, and at least part of the drain electrode 166 may overlap the gate electrode 124. As illustrated in FIG. 1, the source electrode 165 may surround the drain electrode 166 in a 'U' shape at a predetermined distance from the drain electrode 166. However, the source electrode 165 may also extend in a bar shape and may be disposed parallel to the drain electrode 166 at a predetermined distance from the drain electrode 166.

The semiconductor layer 140 may also be formed in an area between the source electrode 165 and the drain electrode 166. For example, the source electrode 165 and the drain electrode 166 may partially overlap or contact the semiconductor layer 140 and may be placed to face each other with the semiconductor layer 140 interposed between them.

The data line 162, the source electrode 165 and the drain electrode 166 may include aluminum, copper, silver, molybdenum, chrome, titanium, tantalum or an alloy of these metals. In addition, each of the data line 162, the source electrode 165 and the drain electrode 166 may have, but is not limited to, a multilayer structure composed of a lower layer, including a refractory metal, and an upper layer, including a material that has a low resistivity.

The gate electrode 124, the semiconductor layer 140, the source electrode 165 and the drain electrode 166 may form the TFT 167, which is a switching device. The TFT 167 may be disposed in an area of a pixel 10 outside the active area 11, in each of the pixels 10.

A passivation layer 171 is disposed on the gate insulating layer 130 and the TFT 167. The passivation layer 171 may include an inorganic insulating material and cover the TFT 167. The passivation layer 171 may protect the TFT 167 from other elements disposed on the TFT 167.

A color filter layer 172 is disposed on the passivation layer 171. The color filter layer 172 may transmit a predetermined wavelength band of light, incident from the exterior of the first base substrate 110, and block light of other wavelength such that light output from the second base substrate 310 has a predetermined color.

In an exemplary embodiment of the present invention, the color filter layer 172 may include a plurality of color filters. For example, each color filter may display a primary color, e.g., red, green or blue. However, each of the color filters may also display different colors, such as cyan, magenta, yellow or white.

The position of the color filter layer 172 is not limited to the above example. In an exemplary embodiment of the present invention, the color filter layer 172 may be disposed on the second base substrate 310.

The first overcoat layer 180 may be disposed on the color filter layer 172. The first overcoat layer 180 may reduce steps formed on the passivation layer 171 and the color filter layer 172. The first overcoat layer 180 may include an organic insulating material such as a photosensitive resin composition, benzocyclobutene (BCB), or photoacryl. However, the materials that may be included the first overcoat layer 180 are not limited to an organic insulating material. For example, in an exemplary embodiment of the present invention, the first overcoat layer 180 may include an inorganic insulating material.

A contact hole 184 may be formed in the color filter layer 172 and the first overcoat layer 180. The contact hole 184 may expose part of the TFT 167, for example, part of the drain electrode 166. Part of the drain electrode 166 and the pixel electrode 190, disposed on the first overcoat layer 180, may be physically and electrically connected to each other by a conductive material formed in the contact hole 184. The conductive material formed in the contact hole 184 may be part of the pixel electrode 190.

The first overcoat layer 180 includes a base layer 181 and a plurality of ridge patterns 182.

An upper surface of the base layer 181 may be substantially flat and may planarize steps formed on the passivation layer 171 and the color filter layer 172.

The ridge patterns 182 may be disposed on the upper surface of the base layer 181. The ridge patterns 182 may extend along the second direction Y. Each pair of neighboring ridge patterns 182 may be disposed parallel to each other with a gap between them. A groove 183 may be defined between each pair of the neighboring ridge patterns 182.

A cross-section of each of the ridge patterns 182, taken along a the first direction X, may be shaped like a trapezoid whose upper side is shorter than a lower side. For example, the cross-section of each of the ridge patterns 182 in an XZ plane may be shaped like a trapezoid. However, the cross-section of each of the ridge patterns 182 is not limited to the trapezoidal shape, and can have a different shape which depends on a method of forming the ridge patterns 182. In an exemplary embodiment of the present invention, the cross-section of each of the ridge patterns 182 may be shaped like a trapezoid whose upper side is longer than a lower side or may be shaped like a semicircle.

Distances between ridge patterns 182, disposed in a left half plane of the active area 11, may be equal, as shown in FIG. 4. Distances between ridge patterns 182, disposed in a right half plane of the active area 11, may be equal, as shown in FIG. 4. However, the present invention is not limited thereto, and the distances between the ridge patterns 182 disposed in the left half plane or in the right half plane can be different and can be set according to a predetermined arrangement criteria. For example, in an exemplary embodiment of the present invention, the distance between adjacent ridge patterns 182 may increase as the distance from a center of the active area 11 increases. In addition, in an exemplary embodiment of the present invention, the distance between adjacent ridge patterns 182 may decrease as the distance from the center of the active area 11 increases.

In an exemplary embodiment of the present invention, the distances between the ridge patterns 182, disposed in the left half plane of the active area 11, and the distances between the ridge patterns 182, disposed in the right half plane of the active area 11, may be equal. For ease of description, the distances between the ridge patterns 182, disposed in the left half plane of the active area 11, and the distances between the ridge patterns 182, disposed in the right half plane of the active area 11, will be defined as a distance d1, as shown in FIGS. 4 and 5. The distance d1 between the ridge patterns 182 may be defined as a width of the groove 183.

A distance between a ridge pattern 182 disposed closest to the center of the active area 11, among the ridge patterns 182 disposed in the left half plane of the active area 11, and a ridge pattern 182 disposed closest to the center of the active area 11, among the ridge patterns 182 disposed in the right half plane of the active area 11, may be different from the distance d1 between the ridge patterns 182 disposed in the left half plane of the active area 11 or the distance d1 between the ridge patterns 182 disposed in the right half plane of the active area 11.

The ridge patterns 182, disposed in the active area 11, may have the same width d2. The width d2 of each of the ridge patterns 182 may be a maximum width measured in the cross-section taken along the first direction X. For example, the width d2 of each of the ridge patterns 182 may be defined as a distance between adjacent grooves 183.

The distance d1 between the ridge patterns 182 and the width d2 of each of the ridge patterns 182 may be equal. For example, a ratio of the distance d1 between the ridge patterns 182 and the width d2 of each of the ridge patterns 182 may be 1:1. However, the ratio is not limited to 1:1 and can vary as needed.

The ridge patterns 182 disposed in the active area 11 may have the same height d3. The height d3 of each of the ridge patterns 182 may be measured in a third direction Z, or perpendicularly from the upper surface of the base layer 181 to an upper surface of the corresponding ridge pattern 182, as shown in FIG. 5. It is understood that the height d3 may also be referred to as a thickness of the ridge patterns 182.

The third direction Z may be a direction perpendicular to a plane formed by the first direction X and the second direction Y. The first base substrate 110 may be disposed in the plane formed by the first direction X and the second direction Y.

The base layer 181 and the ridge patterns 182 may include the same material. However, the present invention is not limited thereto, and the base layer 181 and the ridge pattern 182 may also include different materials.

When the base layer 181 and the ridge patterns 182 include the same material, they may be formed in one mask process together with the contact hole 184. A manufacturing method used in this case will be described below.

However, even if the base layer 181 and the ridge patterns 182 include the same material, they can also be formed in different mask processes. In addition, in an exemplary embodiment of the present invention, the base layer 181 may be omitted. In this case, the ridge patterns 182 may be formed on the color filter layer 172. In addition an insulating layer may be formed on the color filter layer 172 and the ridge patterns 182 or on the pixel electrode 190, to overlap the color filter layer 172 and the ridge patterns 182 or the pixel electrode 190, to prevent the color filter layer 172 from affecting the liquid crystal layer 200. In an exemplary embodiment of the present invention, the ridge patterns 182 extend substantially in the second direction Y. When the ridge patterns 182 extend in the second direction Y, the visibility of the LCD, when viewed from the left side or the right side, may be increased. However, to increase the visibility of the LCD, when viewed from above or below, the ridge patterns 182 may be formed to extend substantially in the first direction X. Accordingly, the direction in which the ridge patterns 182 extend may vary as needed.

The pixel electrode 190 is disposed on the first overcoat layer 180 and the ridge patterns 182. The pixel electrode 190 may be physically connected to the drain electrode 166 by the contact hole 184, and thus receive a voltage from the drain electrode 166.

The pixel electrode 190 may include a transparent conductive material such as indium tin oxide (ITO), indium zinc oxide (IZO), indium tin zinc oxide (ITZO), or Al-doped zinc oxide (AZO).

The pixel electrode 190 may include a stem electrode 191 and a plurality of branch electrodes 192. For example, the stem electrode 191 may extend in the first direction X and the second direction Y in a cross or plus sign (+) shape and divide an area of each pixel 10, in which the pixel electrode 190 is disposed, into four domains. The four domains may be first through fourth quadrants. A domain corresponding to the first quadrant may be defined as a first domain DM1, a domain corresponding to the second quadrant may be defined as a second domain DM2, a domain corresponding to the third quadrant may be defined as a third domain DM3, and a domain corresponding to the fourth quadrant may be defined as a fourth domain DM4.

The branch electrodes 192 may extend from the stem electrode 191 in a direction oblique to both the first direction X and the second direction Y. In addition, the branch electrodes 192 disposed in any one of the first through fourth domains DM1 through DM4 may be parallel to each other with a gap between them. A slit 193, which is an opening without a transparent conductive material, may be defined between each pair of the branch electrodes 192. Since the branch electrodes 192 are disposed parallel to each other with a gap between them in each of the first through fourth domains DM1 through DM4, the slits 193 may also be disposed parallel to each other with a gap between them.

The branch electrodes 192 may extend in a different direction in each of the first through fourth domains DM1 through DM4 but may form the same angle θ1 with respect to the first direction X in the first through fourth domains DM1 through DM4. Here, the angle θ1 formed by the branch electrodes 192, with respect to the first direction X, denotes an absolute value of a smaller one of angles formed by an arbitrary straight line extending along the first direction X and an arbitrary straight line extending along the direction in which the branch electrodes 192 extend.

The angle θ1 formed by the branch electrodes 192 and the first direction X may be in the range of about 30 to about 50 degrees. As the angle θ1 formed by the branch electrodes 192 and the first direction X is closer to 35 degrees, the increase of visibility of the LCD can be maximized. This will be described below.

The pixel electrode 190 may be disposed on the first overcoat layer 180 to have a shape similar to the shape of the upper surface of the base layer 181 and the ridge patterns 182. For example, the pixel electrode 190 may be conformally disposed along surface steps of the first overcoat layer 180. Therefore, a distance measured along the third direction Z between the pixel electrode 190, disposed on the upper surface of the base layer 181, and the pixel electrode 190, disposed on the upper surface of each of the ridge patterns 182, may be the height d3 of each of the ridge patterns 182.

In addition, a thickness d4 of the pixel electrode 190, measured along the third direction Z, may be smaller than the height d3 of each of the ridge patterns 182. Since the thickness d4 of the pixel electrode 190 is smaller than the height d3 of each of the ridge patterns 182, the pixel electrode 190 can more accurately illustrate the steps formed by the ridge patterns 182. Accordingly, since the pixel electrode 190 accurately mimics the steps of the overcoat layer 180, the visibility of the LCD may be increased.

The stem electrode 191 includes a first sub-stem electrode 191_1, a second sub-stem electrode 191_2, and a third sub-stem electrode 191_3. Here, the first sub-stem electrode 191_1 is the portion of the stem electrode 191 which extends in the first direction X, the second sub-stem electrode 191_2 is the portion of the stem electrode 191 which extends in the second direction Y, and the third sub-stem electrode 191_3 is an area of the stem electrode 191 in which the first sub-stem electrode 191_1 and the second sub-stem electrode 191_2 intersect each other.

The second sub-stem electrode 191_2 might not overlap the ridge patterns 182. For example, both the second sub-stem electrode 191_2 and the ridge patterns 182 may extend along the second direction Y. Since the second sub-stem electrode 191_2 and the ridge patterns 182 are disposed parallel to each other with a gap between them, the second sub-stem electrode 191_2 and the ridge patterns 182 might not overlap each other in the active area 11. In addition, since the third sub-stem electrode 191_3 is disposed at the center of the second sub-stem electrode 191_2, the third sub-stem electrode 191_3 might not overlap the ridge patterns 182 in the active area 11. For example, the second sub-stem electrode 191_2 and the third sub-stem electrode 191_3 may be placed to overlap the base layer 181. Since the first sub-stem electrode 191_1 extends along the first direction X in the active area 11, the first sub-stem electrode 191_1 may overlap the ridge patterns 182 in the active area 11.

The first overcoat layer 180 and the pixel electrode 190 structured, as described above, can increase the visibility of the LCD. The increase of the visibility of the LCD may also be related to the movement of the liquid crystals 201 of the liquid crystal layer 200.

A first alignment layer may be disposed on the pixel electrode 190. The first alignment layer may provide a pretilt angle to the liquid crystals 201 of the liquid crystal layer 200. For example, in a state where no electric field is applied to the liquid crystal layer 200, the first alignment layer may cause the liquid crystals 201 to be arranged in an arbitrary direction at an angle of 0.5 to 3 degrees with respect to the third direction Z.

The second display substrate 300 will be described hereinafter.

The second display substrate 300 includes a second base substrate 310, a light-blocking member 320, a second overcoat layer 330, a common electrode 340, and a second alignment layer. In an exemplary embodiment of the present invention, the common electrode 340 may be shaped like a plate. For example, the common electrode 340 might not have slits or openings in the active area 11.

The second base substrate 310 is placed to face the first base substrate 110 and may be durable enough to withstand a predetermined degree of external impact. The second base substrate 310 may be a transparent insulating substrate. For example, the second substrate 310 may be a glass substrate, a quartz substrate, a transparent resin substrate, or the like. The second base substrate 310 may be flat or curved in a given direction.

The light-blocking member 320 is disposed on a surface of the second base substrate 310, which faces the first display substrate 100. The light-blocking member 320 may be disposed to overlap the gate line 122, the storage line 125, the data line 162, the TFT 167 and the contact hole 184. For example, the light-blocking member 320 may overlap an area of the LCD other than the active areas 11. The light-blocking member 320 may block light from being transmitted through the area of the LCD other than the active areas 11.

The second overcoat layer 330 is disposed on the second base substrate 310 and the light-blocking member 320. The second overcoat layer 330 may reduce a step formed by the light-blocking member 320. In an exemplary embodiment of the present invention, the color filter layer 172 may be disposed on the second base substrate 310 instead of the first base substrate 110. In this case, the second overcoat layer 330 can reduce a step formed by the color filter layer 172, disposed on the second base substrate 310.

The common electrode 340 is disposed on ('under' in the drawings) the second overcoat layer 330. The common electrode 340 may include a transparent conductive material such as ITO, IZO, ITZO, or AZO. The common electrode 340 may be formed on the whole surface of the second base substrate 310. A common signal from an external source is transmitted to the common electrode 340. Thus, the common electrode 340 may form an electric field together with the pixel electrode 190.

A second alignment layer may be disposed on the common electrode 340. The second alignment layer may function similarly to the first alignment layer. For example, the second alignment layer may control the initial alignment of the liquid crystals 201.

The liquid crystal layer 200 will be described hereinafter.

The liquid crystal layer 200 may include a plurality of liquid crystals 201 having dielectric anisotropy and refractive anisotropy. In a state where no electric field is applied to the liquid crystal layer 200, the liquid crystals 201 may be arranged in a direction perpendicular to the surface of the first display substrate 100 and the surface of the second display substrate 300. In an exemplary embodiment of the present invention, the liquid crystals 201 may also be arranged between the first display substrate 100 and the second display substrate 300 in a direction parallel to the two substrates 100 and 300. When an electric field is formed between the first display substrate 100 and the second display substrate 300, the liquid crystals 201 may rotate or tilt in a specific direction between the first display substrate 100 and the second display substrate 300, and may change the polarization of light.

The increase of visibility of the LCD will now be described in greater detail with reference to FIGS. 6 and 7.

Figure 6:
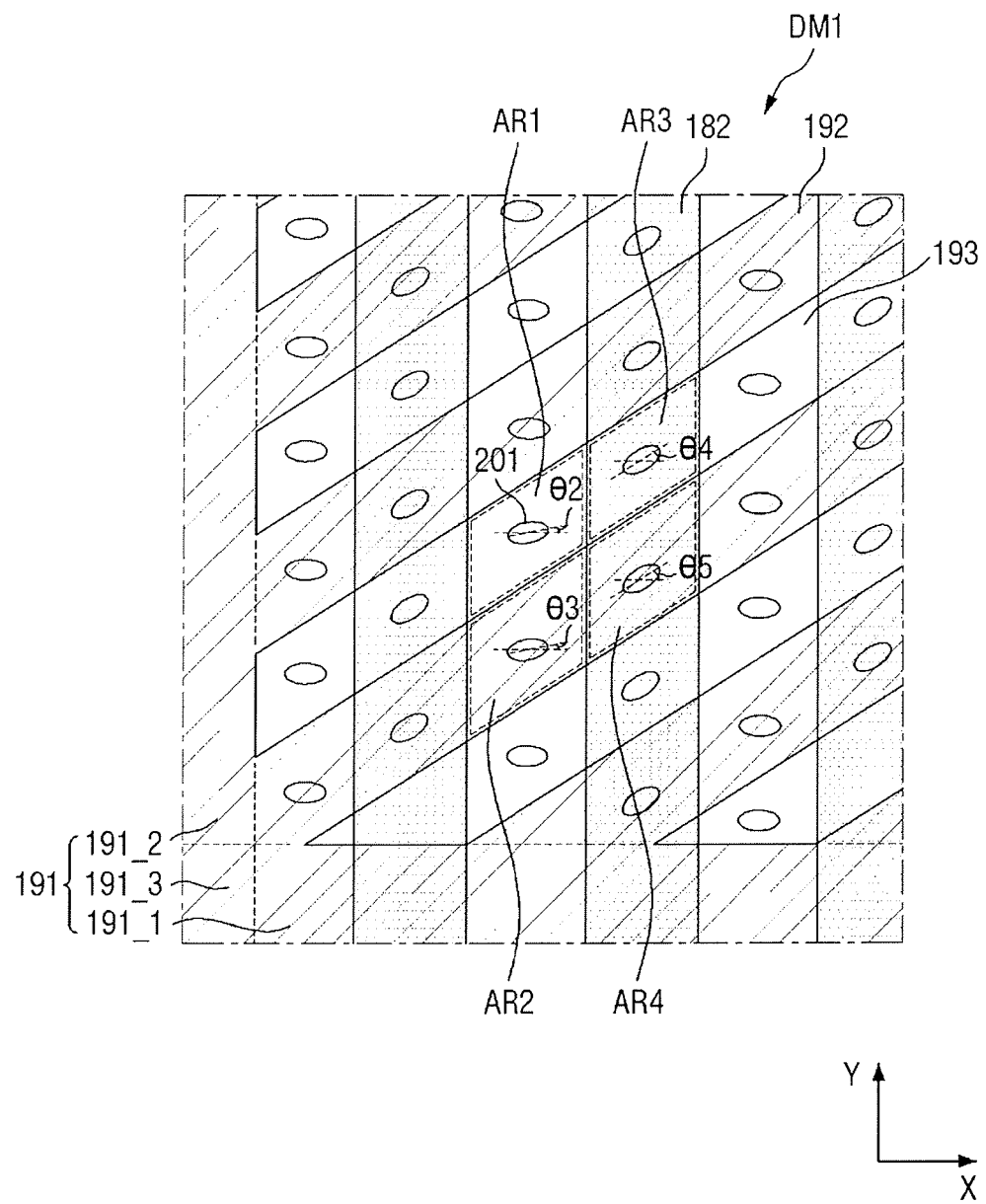
FIG. 6 is an enlarged plan view illustrating a first domain of FIG. 4 at a low gray level according to an exemplary embodiment of the present invention.

FIG. 6 is an enlarged plan view illustrating the first domain DM1 of FIG. 4 according to an exemplary embodiment of the present invention. FIG. 7 is an enlarged plan view illustrating the first domain DM1 of FIG. 4 at a high gray level according to an exemplary embodiment of the present invention. At a low gray level, a low voltage is applied to the pixel electrode 190. At a high gray level, a high voltage is applied to the pixel electrode 190.

Figure 7:
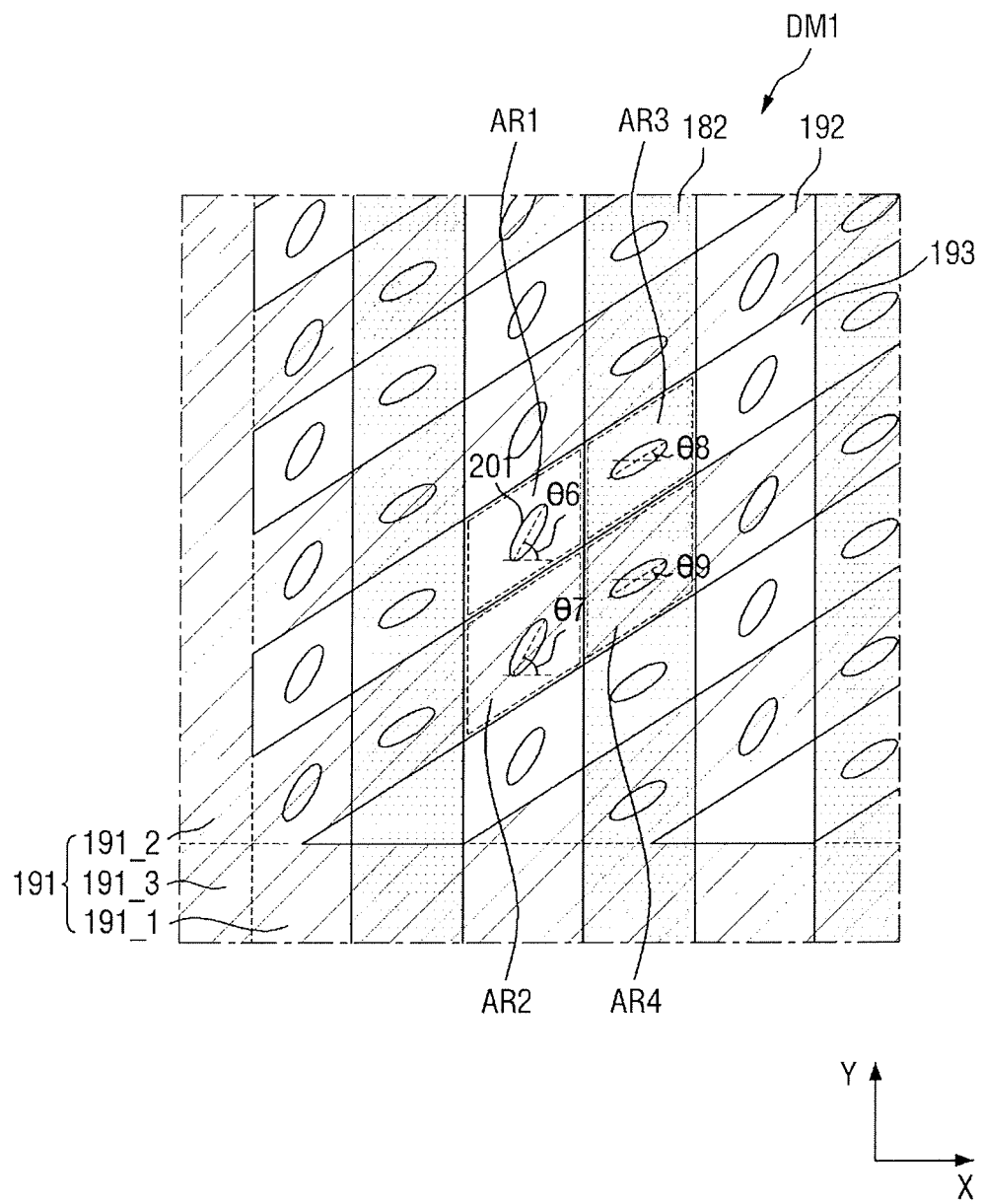
FIG. 7 is an enlarged plan view of the first domain of FIG. 4 at a high gray level at according to an exemplary embodiment of the present invention.

Since FIGS. 6 and 7 are enlarged plan views illustrating the same domain of a pixel 10. In addition, the first overcoat layer 180 and the pixel electrode 190 have the same structure in both FIG. 6 and FIG. 7. However, since different voltages are provided to the pixel electrode 190 in FIGS. 6 and 7, the arrangement of the liquid crystals 201 is different in each of FIGS. 6 and 7.

In FIGS. 6 and 7, tilted liquid crystals 201 are illustrated as seen from above, e.g., in plan view. The liquid crystals 201 are tilted more as their long axes are longer, and a direction in which the long axes of the liquid crystals 201 extend is a direction in which the liquid crystals 201 are tilted.

Referring to FIGS. 6 and 7, the first domain DM1 may be divided into four areas. For example, the first domain DM1 may be divided into a first area AR1 in which a ridge pattern 182 and a branch electrode 192 are not disposed, a second area AR2 in which only a branch electrode 192 is disposed, a third area AR3 in which only a ridge pattern 182 is disposed, and a fourth area AR4 in which both a branch electrode 192 and a ridge pattern 182 are disposed. For ease of description, one first area AR1, one second area AR2, one third area AR3, and one fourth area AR4, as illustrated in FIGS. 6 and 7, will be described below.

Referring to FIG. 6, at a low gray level at which the intensity of an electric field formed in the liquid crystal layer 200 is relatively low due to a relatively low voltage applied to the pixel electrode 190, angles θ2 and θ3, formed by long axes of liquid crystals 201 in the first area AR1 and the second area AR2 with respect to the first direction X, may be smaller than angles θ4 and θ5, formed by long axes of liquid crystals 201 in the third area AR3 and the fourth area AR4 with respect to the first direction X.

At a low gray level, as the angles formed by the long axes of the liquid crystals 201 in the first area AR1 and the second area AR2 with respect to the first direction X are closer to 0 degrees, the ends of the liquid crystals 201 in the first area AR1 and the second area AR2 are seen when the LCD is viewed from the side. Therefore, luminance at a low gray level is reduced, resulting in increased visibility. Hence, the above arrangement of the liquid crystals 201 in the first area AR1 and the second area AR2 can increase visibility at a low gray level by reducing the brightness difference of the LCD when viewed from different points of view. However, since the increase of visibility depends on the interaction with a polarizing plate disposed outside the first base substrate 110 and the second base substrate 310, other cases can result from a change in the polarization axis of the polarizing plate.

For example, the intensity of an electric field formed in the liquid crystal layer 200 is relatively lower at a low gray level than at a high gray level. Therefore, in the first area AR1 and the second area AR2, a force with which the liquid crystals 201 are arranged by a step between adjacent ridge patterns 182 may be stronger than a force with which the liquid crystals 201 are arranged by an electric field. Accordingly, the liquid crystals 201 in the first area AR1 and the second area AR2 may be tilted close to a direction perpendicular to the direction in which the ridge patterns 182 extend. Consequently, the angles formed by the liquid crystals 201 in the first area AR1 and the second area AR2 with respect to the first direction X at a low gray level may be close to 0 degrees.

The liquid crystals 201 in the fourth area AR4 are located close to a branch electrode 192 and disposed on a ridge pattern 182. Therefore, the effect of a step formed by the ridge pattern 182 is minimized. Consequently, the liquid crystals 201 disposed in the fourth area AR4 may be tilted along a direction parallel to the direction in which the branch electrodes 192 extend.

The liquid crystals 201 in the third area AR3 are disposed on the ridge pattern 182. Therefore, as in the fourth area AR4, the effect of the step formed by the ridge pattern 182 is minimized. Consequently, the liquid crystals 201 in the third area AR3 may be tilted in a generally similar direction to the direction in which the liquid crystals 201 in the fourth area AR4 are tilted. The third and fourth areas AR3 and AR4 may be adjacent to each other in the second direction Y.

Therefore, the liquid crystals 201 in the third area AR3, as in the fourth area AR4, may be tilted along the direction parallel to the direction in which the branch electrodes 192 extend.

Referring to FIG. 7, at a high gray level, at which the intensity of an electric field formed in the liquid crystal layer 200 is relatively high due to a relatively high voltage applied to the pixel electrode 190, angles θ6 and θ7, formed by the long axes of the liquid crystals 201 in the first area AR1 and the second area AR2 with respect to the first direction X, may be greater than angles θ8 and θ9, formed by the long axes of the liquid crystals 201 in the third area AR3 and the fourth area AR4, with respect to the first direction X.

At a high gray level, as the angles formed by the long axes of the liquid crystals 201 with respect to the first direction X are closer to 45 degrees, the overall transmittance of the LCD increases. Therefore, at a high gray level, the liquid crystals 201 in the first area AR1 are arranged to form an angle that is closer to 45 degrees than to 0 degrees, with respect to the first direction X. Accordingly, the overall transmittance of the LCD can be increased.

For example, the intensity of an electric field formed in the liquid crystal layer 200 is relatively higher at a high gray level than at a low gray level. Therefore, in the first area AR1, a force with which the liquid crystals 201 are arranged by an electric field may be stronger than a force with which the liquid crystals 201 are arranged by a step between adjacent ridge patterns 182. Accordingly, the liquid crystals 201 in the first area AR1 may be tilted close to a direction that is parallel to the direction in which the branch electrodes 192 extend.

In addition, the liquid crystals 201 are tilted more at a high gray level than at a low gray level. Therefore, at a high gray level, the liquid crystals 201 may be arranged along a direction in which a step is formed between adjacent ridge patterns 182. This is because the step formed between the adjacent ridge patterns 182 serves as a groove. Therefore, the angles θ6 and θ7, formed by the long axes of the liquid crystals 201 in the first area A1 and the second area AR2 with respect to the first direction X may be greater than the angles θ8 and θ9, formed by the long axes of the liquid crystals 201 in the third area AR3 and the fourth area AR4 with respect to the first direction X.

Since the direction in which the liquid crystals 201 in the third area AR3 and the fourth area AR4 are tilted is controlled by the pixel electrode 190, the liquid crystals 201 in the third area AR3 and the fourth area AR4 may be tilted in the direction parallel to the direction in which the branch electrodes 192 extend.

Therefore, as angles formed by the branch electrodes 192 with respect to the first direction X are closer to 35 degrees, angles formed by the liquid crystals 201 in the first domain DM1 with respect to the first direction X at a high gray level are closer to 45 degrees. Therefore, a high transmittance can be obtained.

Thus, due to the above-described arrangement of the liquid crystals 201 the LCD may have increased visibility at a low gray level and an increased transmittance at a high gray level. Hereinafter, a method of manufacturing an LCD, according to an exemplary embodiment of the present invention, will be described with reference to FIGS. 8 through 10.

Figure 8:
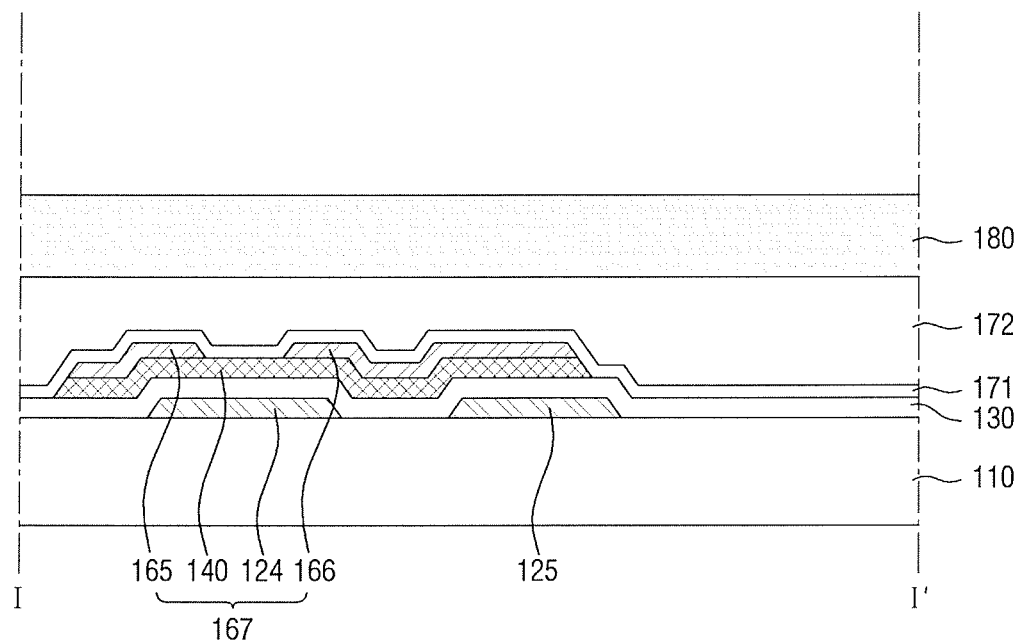
FIGS. 8 through 10 are cross-sectional views illustrating a method of manufacturing an LCD according to an exemplary embodiment of the present invention.
Figure 9:
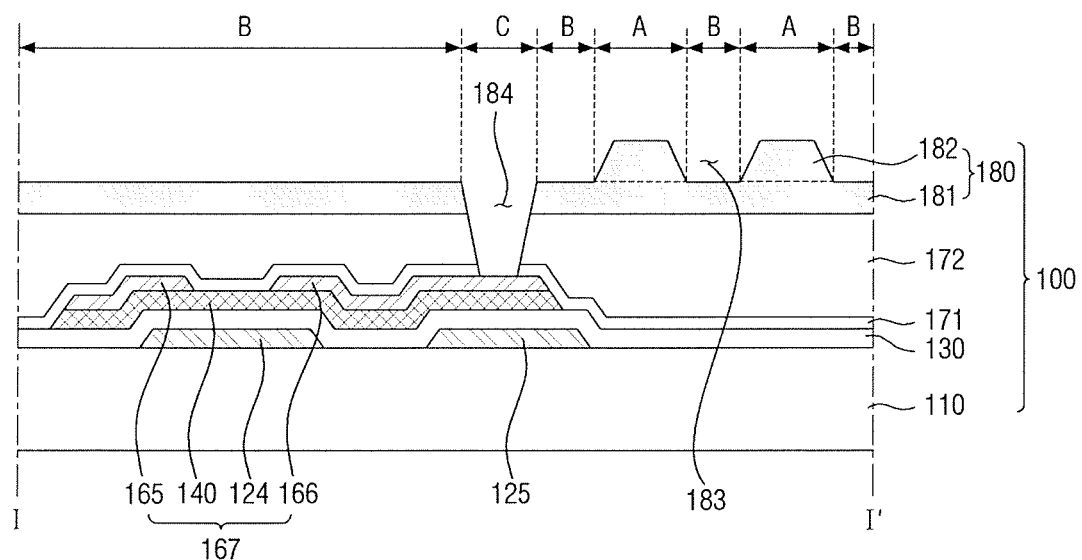
Figure 10:
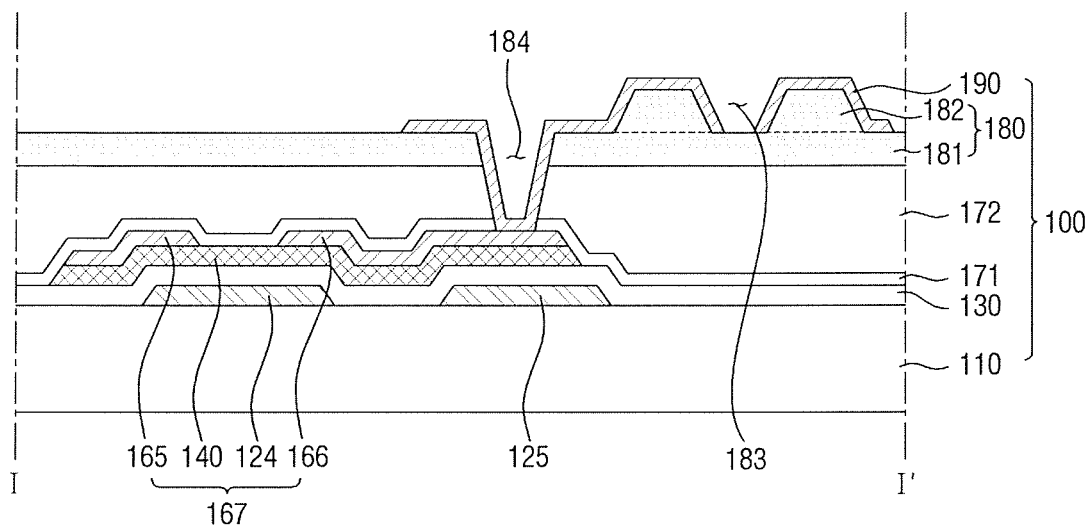

FIGS. 8 through 10 are cross-sectional views illustrating a method of manufacturing an LCD according to an exemplary embodiment of the present invention.

The cross-sectional views of FIGS. 8 through 10 are taken along the line I-I' of FIG. 1.

Referring to FIG. 8, a gate electrode 124 is formed on a first base substrate 110, and a gate insulating layer 130 is formed. Then, a TFT 167, including the gate electrode 124, a drain electrode 166, a source electrode 165 and a semiconductor layer 140, is formed. A passivation layer 171 is formed on the TFT 167, and a first overcoat layer 180 is formed on the passivation layer 171.

Referring to FIG. 9, the first overcoat layer 180 is exposed to light through a mask and then developed to form a contact hole 184 and ridge patterns 182. In an area C corresponding to the contact hole 184, the first overcoat layer 180 and a color filter layer 172 are completely removed to expose the drain electrode 166. In an area B in which the contact hole 184 and the ridge patterns 182 are not disposed, the first overcoat layer 180 is partially removed. In an area A in which the ridge patterns 182 are disposed, the first overcoat layer 180 is left intact.

Thus, the first overcoat layer 180 can be made to have a varying thickness using various methods. To adjust light transmittance of the area B in which the contact hole 184 and the ridge patterns 182 are not disposed, a mask having micro-slits or a grid pattern or a mask having a translucent layer may be used.

Here, a linewidth of a pattern located between the micro-slits or a gap between patterns, for example, a width of each of the micro-slits, may be smaller than a resolution of a stepper used for exposure. In addition, to have the translucent layer, thin films having different transmittances or thicknesses may be used when the mask is manufactured.

Referring to FIG. 10, a pixel electrode 190 is formed on the first overcoat layer 180 to contact the drain electrode 166 through the contact hole 184. Then, as illustrated in FIG. 2, a first display substrate 100 and a second display substrate 300 are aligned and coupled to each other, and a liquid crystal layer 200 is formed by injecting liquid crystals 201 between the first display substrate 100 and the second display substrate 300. As a result, an LCD is produced.

Figure 11:
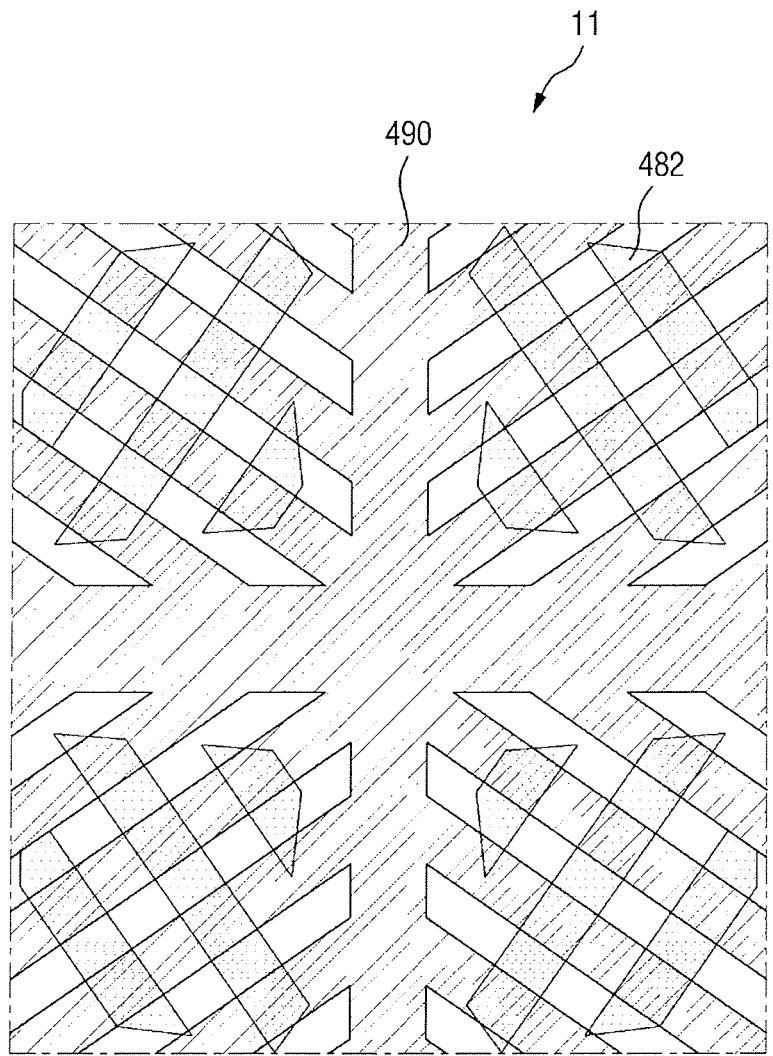
FIG. 11 is a plan view illustrating a first overcoat layer and a pixel electrode disposed in an active area of an LCD according to an exemplary embodiment of the present invention.

FIG. 11 is a plan view illustrating a first overcoat layer 180 and a pixel electrode 190 disposed in an active area 11 of an LCD according to an embodiment.

The arrangement of ridge patterns 482 of the first overcoat layer 180 of the LCD of FIG. 11 may be different from the arrangement of ridge patterns 182 of the LCD of FIG. 4.

As illustrated in FIG. 11, the ridge patterns 482 may be disposed parallel to each other in each of first through fourth domains DM1 through DM4, but might not extend along the second direction Y. In this case, as in FIG. 4, a direction in which branch electrodes 192 extend in each of the first through fourth domains DM1 through DM4 may be different from a direction in which the ridge patterns 482 extend in each of the first through fourth domains DM1 through DM4.

In addition, as illustrated in the drawing, the ridge patterns 482 may extend to different lengths in the active area 11.

Although not illustrated in the drawings, in an exemplary embodiment of the present invention, the ridge patterns 482 may be arranged in the first through fourth domains DM1 through DM4 to form a virtual circle. For example, the ridge patterns 482 may be formed in various shapes as long as they extend in a different direction from the direction in which the branch electrodes 192 extend.

Figure 12:
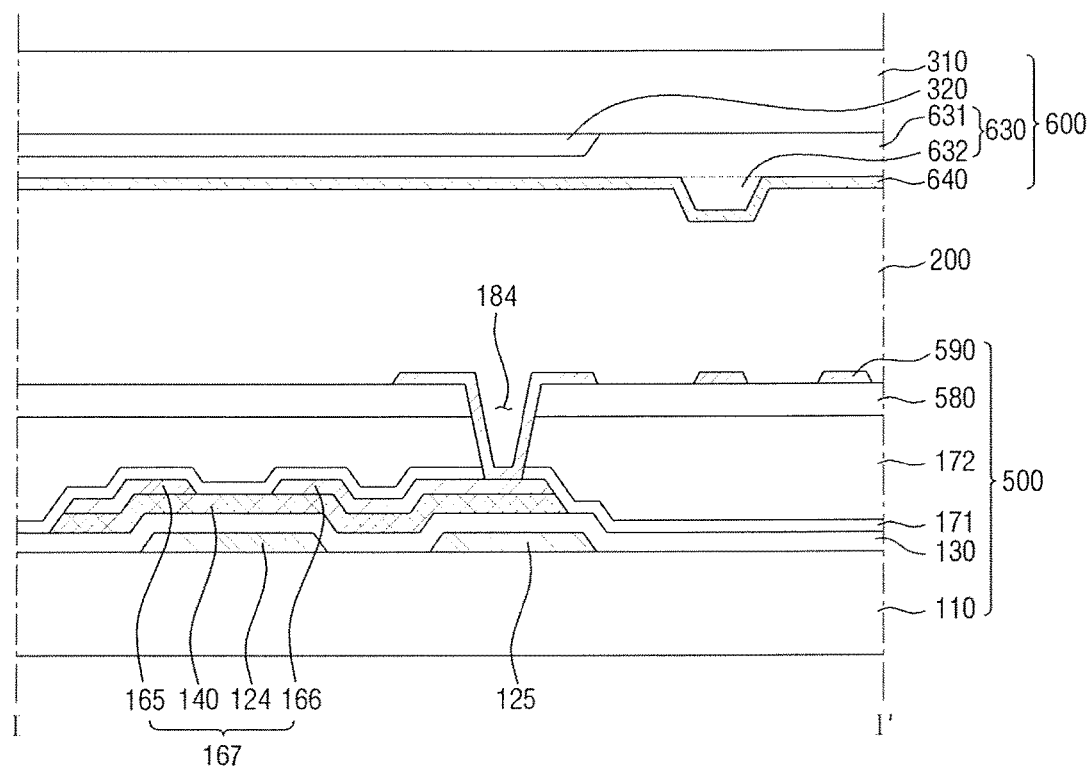
FIG. 12 is a cross-sectional view taken along the line I-I' of FIG. 1, illustrating a pixel of an LCD according to an exemplary embodiment of the present invention.
Figure 13:
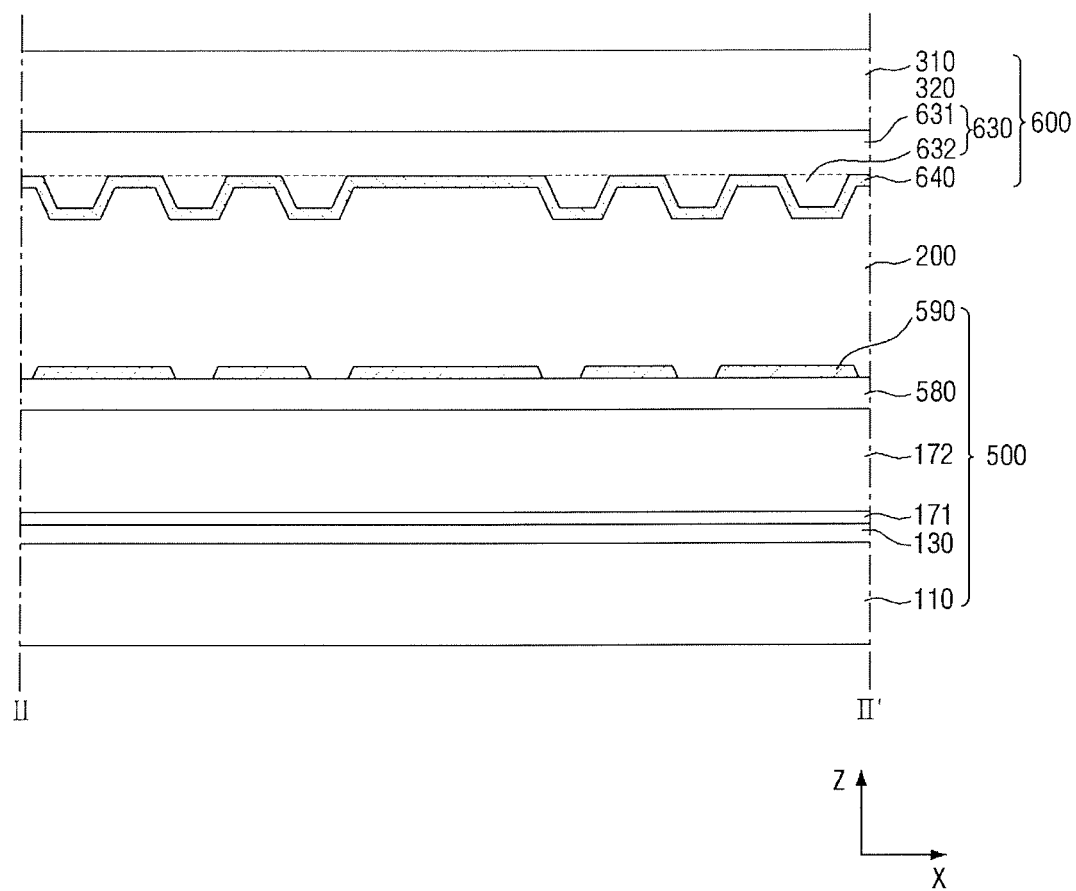
FIG. 13 is a cross-sectional view taken along the line II-II' of FIG. 4, illustrating a pixel of an LCD according to an exemplary embodiment of the present invention.

FIG. 12 is a cross-sectional view taken along the line I-I' of FIG. 1, illustrating a pixel of an LCD according to an exemplary embodiment of the present invention. FIG. 13 is a cross-sectional view taken along the line II-II' of FIG. 4, illustrating a pixel of an LCD according to an exemplary embodiment of the present invention.

Referring to FIGS. 12 and 13, ridge patterns 632 are formed in a second overcoat layer 630, whereas the ridge patterns 182 are formed in the first overcoat layer 180 in the exemplary embodiment described with reference to FIGS. 2 and 4.

Thus, while steps are formed on the pixel electrode 190 in the exemplary embodiment described with reference FIGS. 2 and 4, steps may be formed on a common electrode 640 in an exemplary embodiment of the present invention. In an exemplary embodiment of the present invention, the common electrode 640 may be shaped like a plate. For example, the common electrode 640 might not have slits or openings in the active area 11.

The ridge patterns 632 may be formed in a similar shape to the ridge patterns 182 of FIG. 4 but may be formed in the second overcoat layer 632 instead of the first overcoat layer 180.

The ridge patterns 632 may be manufactured by developing the second overcoat layer 630 to have patterns. The ridge pattern 632 may protrude from a base layer 630. A method for manufacturing the ridge patterns 632 is similar to the method for manufacturing the ridge patterns 182 described above.

According to an exemplary embodiment of the present invention, an LCD has increased visibility.

In addition, in an exemplary embodiment of the present invention, a method of manufacturing an LCD having increased visibility is provided.

While the present invention has been particularly shown and described with reference to exemplary embodiments thereof, it will be apparent to those of ordinary skill in the art that various changes in form and detail may be made therein without departing from the spirit and scope of the present invention.

What is claimed is:

1. A liquid crystal display (LCD), comprising:
a substrate;
an overcoat layer disposed on the substrate; and
a pixel electrode disposed on the overcoat layer,
wherein the pixel electrode comprises a stem electrode and a plurality of branch electrodes, wherein the stem electrode extends in a first direction and in a second direction crossing the first direction to have a cross shape, and the plurality of branch electrodes extends from the stem electrode obliquely to the first direction and the second direction,
wherein the overcoat layer comprises a base layer and a plurality of ridge patterns which protrude from a surface of the base layer, and
wherein the plurality of ridge patterns extends in a different direction from the direction in which the plurality of branch electrodes extends.

2. The LCD of claim 1, wherein the pixel electrode is formed conformally along a surface of the overcoat layer.

3. The LCD of claim 1, wherein the plurality of ridge patterns extends along the second direction.

4. The LCD of claim 3, wherein at least two ridge patterns of the plurality of ridge patterns have a same length in an area in which the pixel electrode is disposed.

5. The LCD of claim 1, wherein the stem electrode comprises:
a first sub-stem electrode which extends in the first direction;
a second sub-stem electrode which extends in the second direction; and a third sub-stem electrode which is disposed in an area where the first and second sub-stem electrodes intersect each other,
wherein a portion of the first sub-stem electrode overlaps the plurality of ridge patterns, and the second sub-stem electrode and the third sub-stem electrode do not overlap the plurality of ridge patterns.

6. The LCD of claim 1, wherein the plurality of ridge patterns overlaps the plurality of branch electrodes.

7. The LCD of claim 1, wherein the stem electrode divides an area in which the pixel electrode is disposed into four sub-areas, and branch electrodes of the plurality of branch electrodes are arranged parallel to each other in each of the four sub-areas.

8. The LCD of claim 7, wherein the plurality of branch electrodes forms an angle of about 30 degrees to about 50 degrees with respect to the first direction.

9. The LCD of claim 8, wherein the plurality of branch electrodes forms an angle of 35 degrees with respect to the first direction.

10. The LCD of claim 1, wherein a height of a first ridge pattern of the plurality of ridge patterns, measured in a direction perpendicular to the substrate, is greater than a thickness of the pixel electrode, measured in the direction perpendicular to the substrate.

11. The LCD of claim 1, wherein a cross-section of a first ridge pattern the plurality of ridge patterns is shaped like a trapezoid.

12. The LCD of claim 1, wherein a slit is formed between a pair of neighboring branch electrodes of the plurality of branch electrodes.

13. The LCD of claim 1, wherein the plurality of ridge patterns extends obliquely to the first direction and the second direction.

14. The LCD of claim 13, wherein a first ridge pattern and a second ridge pattern of the plurality of ridge patterns have different lengths in an area in which the pixel electrode is disposed.

15. The LCD of claim 1, wherein the base layer and the plurality of ridge patterns include a same material.

* * * * *